(12) United States Patent
Pace et al.

(10) Patent No.: US 10,705,687 B1
(45) Date of Patent: Jul. 7, 2020

(54) VISUALLY INDICATING ON A USER INTERFACE LENGTHS, TYPES OF CONTENT, STRUCTURE AND CURRENT USER LOCATION WITHIN A CORPUS OF ELECTRONIC CONTENT

(71) Applicant: Pearson Education, Inc., Hoboken, NJ (US)

(72) Inventors: Michael Pace, Highlands Ranch, CO (US); Adam Beckley, Boston, MA (US); Paul Smith, Brookline, MA (US); Laura Vlassarev, Denver, CO (US); Emily Schneider, San Francisco, CA (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 16/244,692

(22) Filed: Jan. 10, 2019

(51) Int. Cl.
| | |
|---|---|
| *G06F 3/048* | (2013.01) |
| *G06F 3/0482* | (2013.01) |
| *G06F 3/0486* | (2013.01) |
| *G06F 3/0481* | (2013.01) |
| *G06F 3/0483* | (2013.01) |

(52) U.S. Cl.
CPC .......... *G06F 3/0482* (2013.01); *G06F 3/0483* (2013.01); *G06F 3/0486* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 6,369,811 | B1 * | 4/2002 | Graham | G06F 3/0481 358/1.18 |
| 7,228,492 | B1 * | 6/2007 | Graham | G06F 16/9535 715/234 |
| 8,375,293 | B2 * | 2/2013 | Rosner | G06F 40/186 715/234 |
| 2008/0288894 | A1 * | 11/2008 | Han | G06F 3/04845 715/855 |
| 2010/0259562 | A1 * | 10/2010 | Miyazawa | G06F 3/04883 345/684 |
| 2013/0198663 | A1 * | 8/2013 | Matas | G06F 3/0482 715/765 |
| 2015/0177933 | A1 * | 6/2015 | Cueto | G06F 3/0483 715/776 |
| 2015/0324074 | A1 * | 11/2015 | Van Winkle | G06F 3/0483 715/776 |

* cited by examiner

*Primary Examiner* — Thanh T Vu

(74) *Attorney, Agent, or Firm* — Quarles and Brady LLP

(57) ABSTRACT

Systems and methods of visually indicating on a user interface of an electronic reader the lengths, types of content, structure and current location of a user within a corpus of electronic content are presented. The corpus of electronic content may be converted into contiguous visual sections and contiguous thumbnails (of the visual sections). The user interface includes a content strip tray displaying a viewable portion of the thumbnails and a main viewing area displaying a viewable portion of the visual sections. An accent effect may be displayed over the viewable portion of the thumbnails that corresponds with the viewable portion of the visual sections currently displayed in the main viewing area to indicate a location of the user in the electronic content. Additionally, headers, location markers, assignments and notes may be displayed on the viewable portion of the thumbnails.

20 Claims, 11 Drawing Sheets

US 10,705,687 B1

VISUALLY INDICATING ON A USER INTERFACE LENGTHS, TYPES OF CONTENT, STRUCTURE AND CURRENT USER LOCATION WITHIN A CORPUS OF ELECTRONIC CONTENT

FIELD OF THE INVENTION

This disclosure relates to the field of systems and methods of visually indicating on a user interface of an electronic reader the lengths, types of content, structure and current location of a user within a corpus of electronic content.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory.

The present invention provides systems and methods of visually indicating to a user lengths, types of content, structure and current user location within a corpus of electronic content, while reading the corpus of electronic content on an electronic reader.

The systems and methods may convert the corpus of electronic content into a plurality of contiguous visual sections. Each visual section, in the plurality of visual sections, may have a length, based on a length of a corresponding visual section in the corpus of electronic content. As the lengths of the visual sections in the corpus of electronic content vary, the visual sections may have lengths that are unique, non-standard and/or of varying dimensions. Each visual section, in the plurality of visual sections, may have a type of content and a structure.

The systems and methods may convert the corpus of electronic content or the plurality of visual sections into a plurality of contiguous thumbnails that correspond to the plurality of visual sections. Each thumbnail, in the plurality of thumbnails, may be proportional in length to, and visually indicates a type of content and a structure of, a corresponding visual section.

The systems and methods may display, by an electronic reader, in a main viewing area of a user interface to the user a viewable portion of the plurality of visual sections.

The systems and methods may display, by the electronic reader, in a content strip tray of the user interface to the user a viewable portion of the plurality of thumbnails.

The systems and methods may display, by the electronic reader, an accent effect over an accent portion, within the viewable portion of the plurality of thumbnails in the content strip tray. The displayed accent portion corresponds to the viewable portion of the plurality of visual sections in the main viewing area.

The above features and advantages of the present invention will be better understood from the following detailed description taken in conjunction with the accompanying drawings.

BRIEF DESCRIPTION OF THE DRAWINGS

FIG. 5 also includes an inserted header on the viewable portion of thumbnails that is never displayed in the main viewing area.

FIG. 6 also includes an inserted marker on the viewable portion of thumbnails that is never displayed in the main viewing area.

FIG. 7 also includes an assignment on the viewable portion of thumbnails that is never displayed in the main viewing area.

FIG. 8 also includes a content strip tray of a width different than the width of the content strip tray in FIG. 9.

FIG. 9 also includes a content strip tray of a width different than the width of the content strip tray in FIG. 8.

FIG. 10 also includes a note on the viewable portion of thumbnails that is never displayed in the main viewing area.

DETAILED DESCRIPTION

Figure 1:
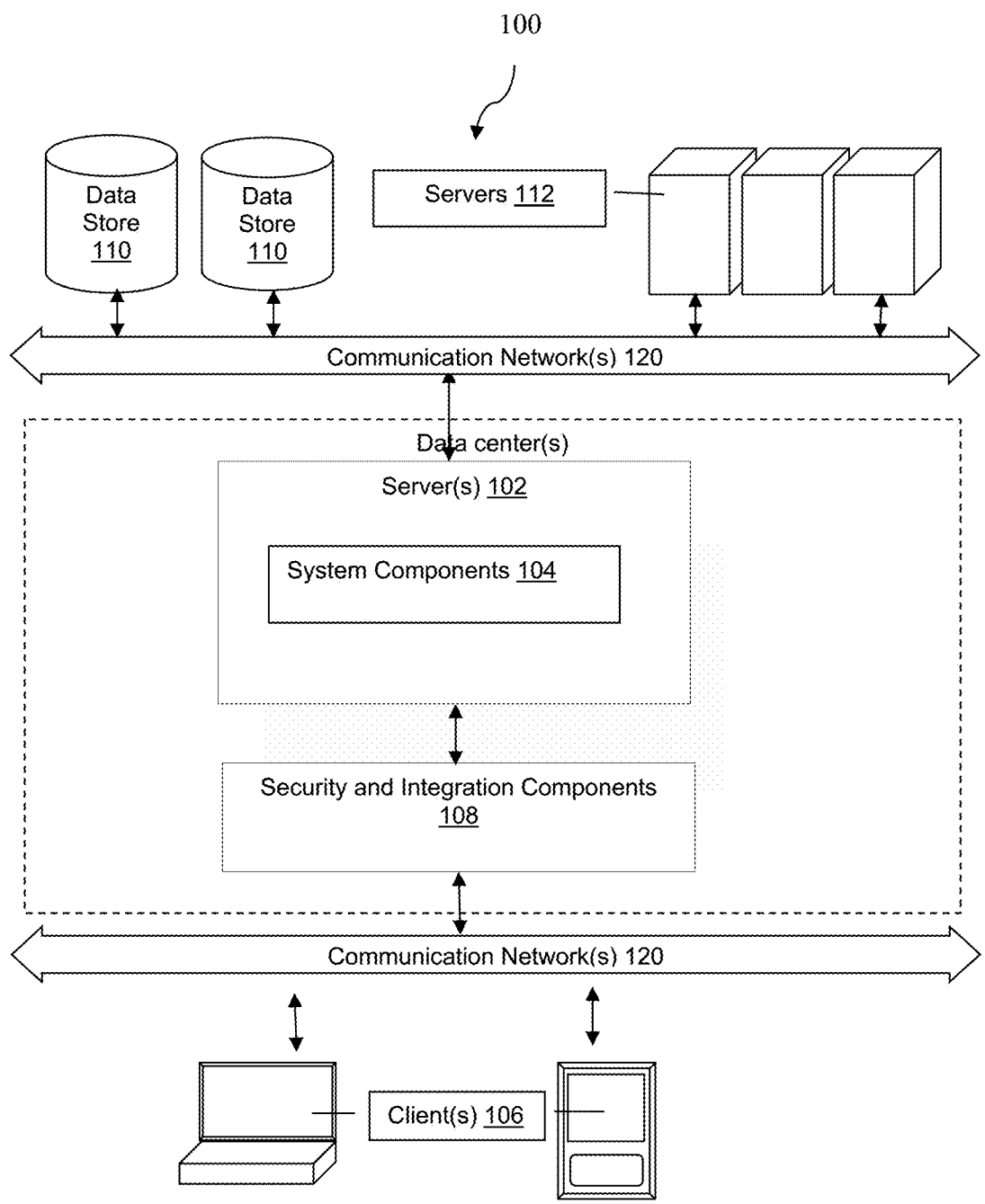
FIG. 1 illustrates a system level block diagram for a non-limiting example of a distributed computing environment that may be used in practicing the invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
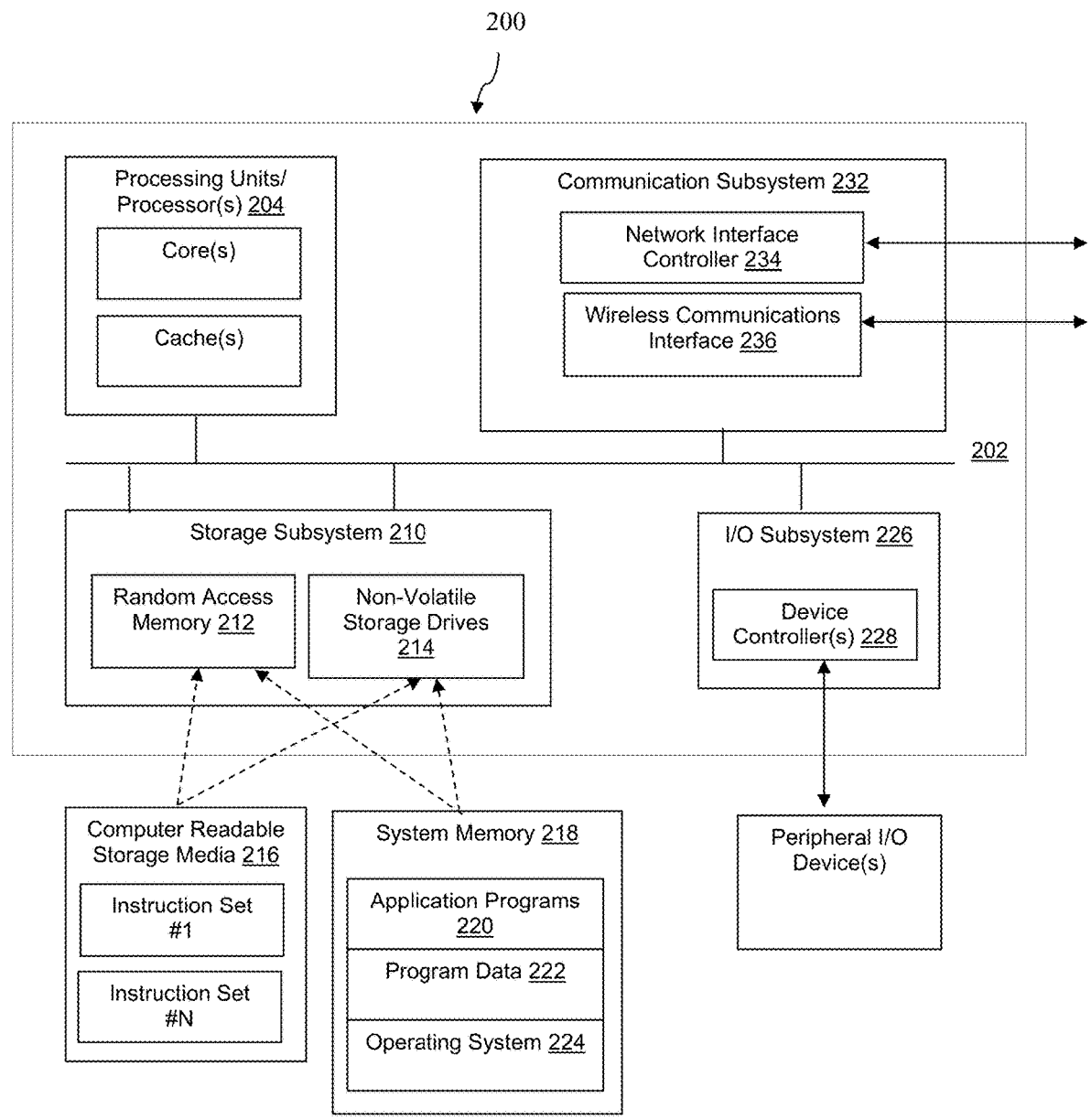
FIG. 2 illustrates a system level block diagram for an illustrative computer system that may be used in practicing the invention.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106.

Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
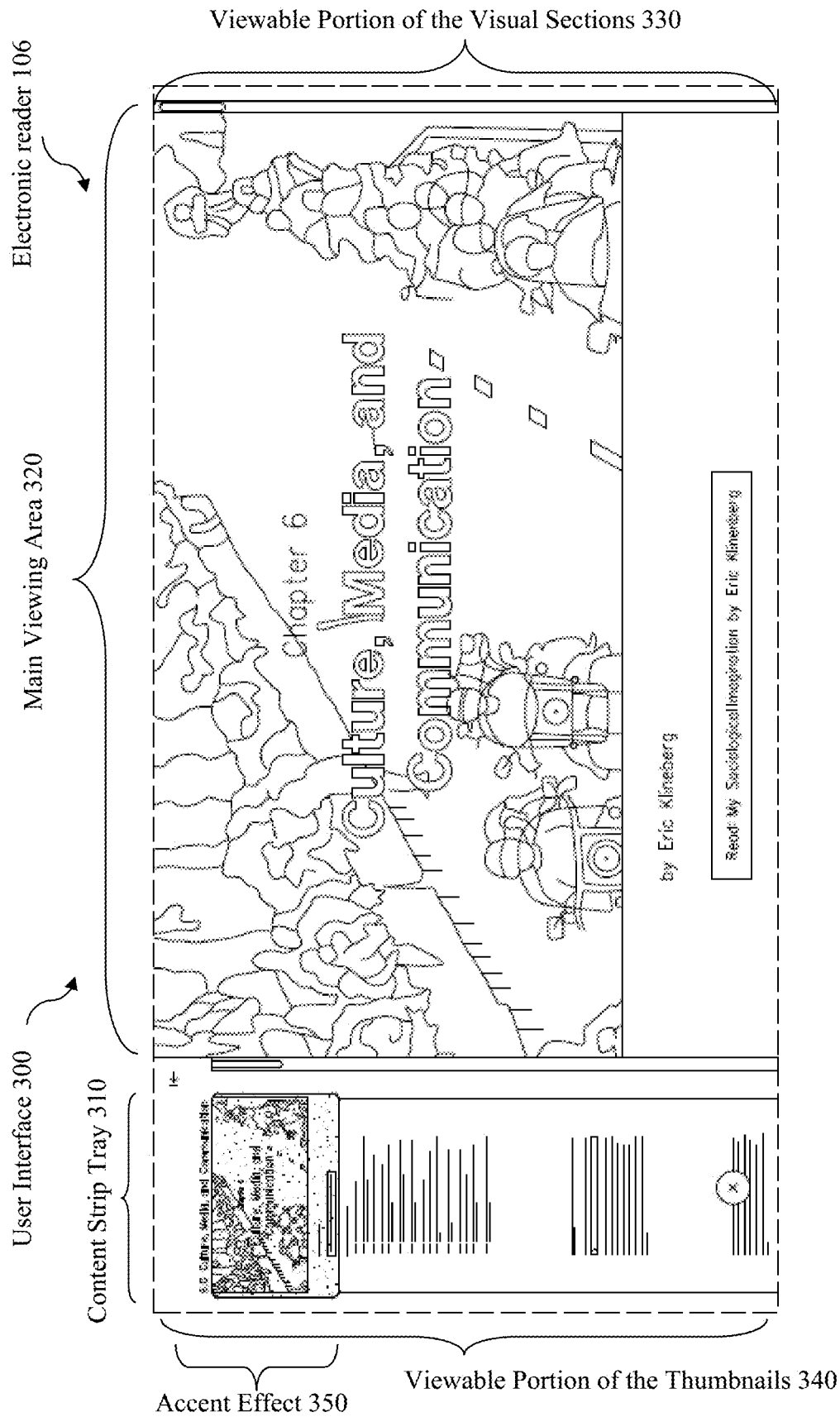
FIG. 3 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.

FIG. 3 illustrates a user interface 300, displayed on an electronic reader 106, with 1) a viewable portion of visual sections 330 displayed in a main viewing area 320; 2) a viewable portion of thumbnails 340 displayed in a content strip tray 310; and 3) an accent effect 350, displayed on the viewable portion of the thumbnails 340, that corresponds with the viewable portion of the visual sections 330 displayed in the main viewing area 320.

Users of electronic readers 106 have long felt a need to understand their "sense of place" within a book. The lack of physical cues, like book thickness, at-a-glance thumb-through, and visual indicators like dog-eared pages, bookmarks, etc., make it harder to get a sense of where the user is in an electronic reader 106. Users also have a hard time estimating the amount of material remaining to read, as well as the time it might take to read it. Users desire to be able to quickly jump from a current location in an electronic reader 106 to another (and possibly back again), while keeping track of both spots. The present invention attempts to solve these problems.

Figure 11:
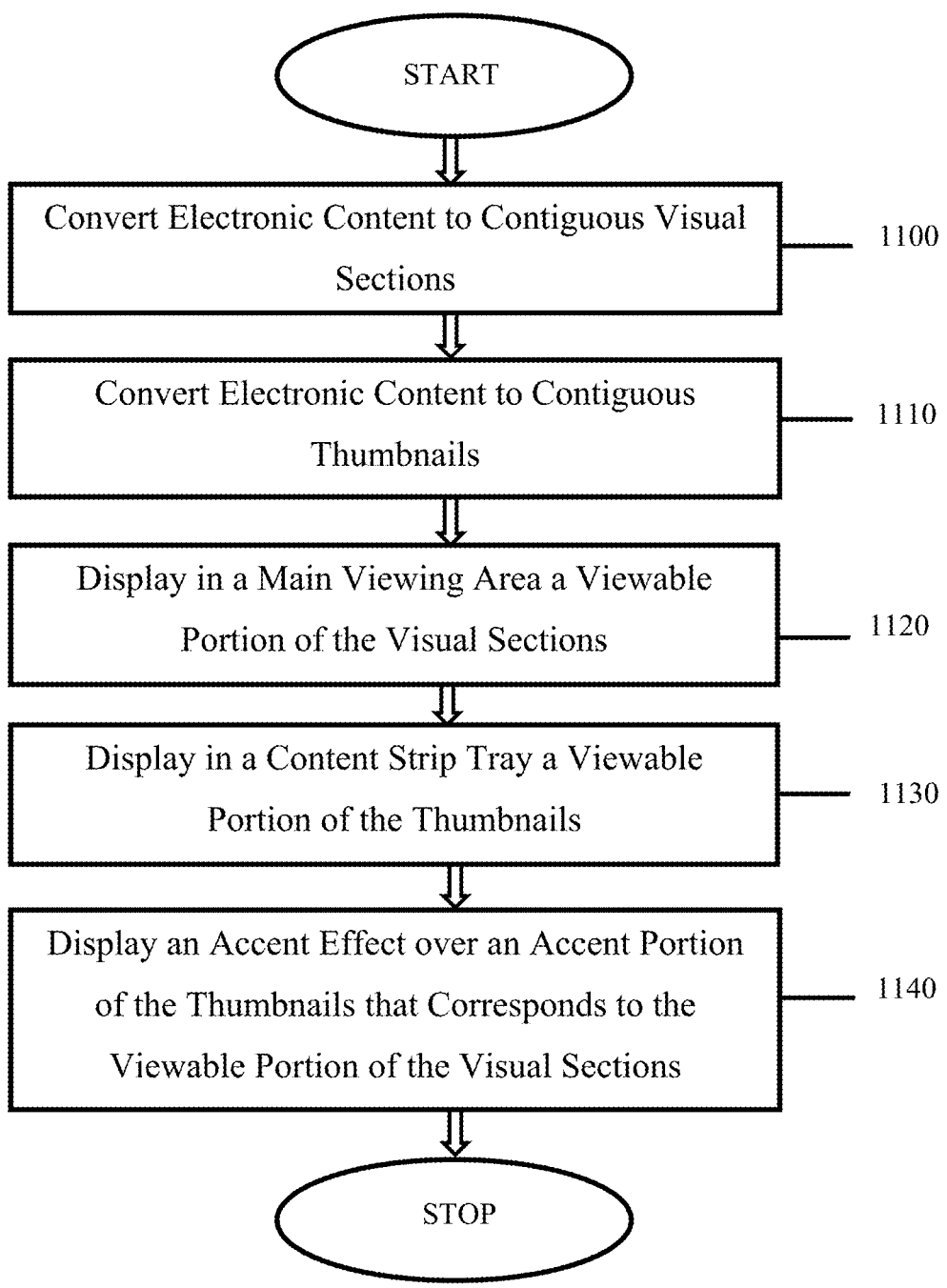
FIG. 11 illustrates a flowchart of a process that may be used to practice the invention.

Referring to FIG. 11, a corpus of electronic content may be created based on material from any desired source material. As non-limiting examples, the source material for the corpus of electronic content may be taken from a book, magazine, journal, or from an electronic database. The corpus of electronic content may comprise any desired types of content. As non-limiting examples, the types of content the corpus of electronic content may comprise are text, charts, graphs, images, figures, audio, video, illustrations, animations and/or pictures.

As a specific example, a textbook, or a chapter in the textbook, may be the source of material for the corpus of electronic content. In a preferred embodiment, the textbook may be broken into a plurality of visual sections. Each visual section may comprise the content from a chapter or a section within the textbook. Thus, a visual section from a long section will be longer than a visual section from a shorter section. This allows each visual section to have a unique length that is proportional and representative of the length of the source material. (Step 1100)

Each visual section may comprise some of the text, charts, graphs, images, figures, audio, video, illustrations and/or pictures from the corpus of electronic content. The plurality of visual sections are preferably ordered as they appear in the corpus of electronic content into a single contiguous long page, which will typically be too long to view all at once in a user interface 300 of an electronic reader 106. The electronic reader 106 may be the above described client, a personal computer with an electronic reader 106 application loaded or a handheld device. Electronic versions of books, magazines, newspapers, etc. may be viewed and/or read on the electronic reader 106.

The corpus of electronic content or the plurality of visual sections may also be converted into a plurality of thumbnail, where each thumbnail corresponds to a visual section. Each thumbnail section may be similar in structure, but preferably smaller, than its corresponding visual section. In some embodiments, each thumbnail may be an exact duplicate, except preferably smaller and optionally, without the functionality, of its corresponding visual section. A visual section that is longer compared to other visual sections will have a corresponding thumbnail that is also longer compared to other thumbnails, while a visual section that is shorter compared to other visual sections will have a corresponding thumbnail that is shorter compared to other thumbnails. As a specific example, a visual section that is twice as long as the average length of the plurality of visual sections will have a corresponding thumbnail that is twice as long as the average length of the plurality of thumbnails. (Step 1110)

Each thumbnail section may also visually indicate the type of content and structure of its corresponding visual section. Thus, a visual section with text and a chart will have a corresponding thumbnail that comprises a similar appearing text and chart, only reduced in the horizontal and the vertical directions.

One or more hardware servers may be used to convert the source material into the corpus of electronic content and the one or more hardware servers may also then convert the corpus of electronic content into the plurality of visual sections and the plurality of thumbnails. The hardware servers may download the plurality of visual sections and the plurality of thumbnails to an electronic reader 106. In another embodiment, the electronic reader 106 may download the corpus of electronic content and then convert the corpus of electronic content into the plurality of visual sections and the plurality of thumbnails.

The electronic reader 106 may use the user interface 300 to display information to a user. In a preferred embodiment, the user interface 300 may comprise a main viewing area 320, for displaying a viewable portion of the plurality of visual sections 330, and a content strip tray 310, for displaying a viewable portion of the plurality of thumbnails 340. (Steps 1120 and 1130)

It should be appreciated that only a portion of the plurality of visual sections will typically be viewable in the main viewing area 320, which may be referred to as the viewable portion of the visual sections 330. It should also be appreciated that only a portion of the plurality of thumbnails will typically be viewable in the content strip tray 310, which may be referred to as the viewable portion of the thumbnails 340. Nevertheless, as the thumbnails are preferably smaller, there will typically be more thumbnail(s) in the viewable portion of the plurality of thumbnails 340 than visual section(s) in the viewable portion of the plurality of visual sections 330. The viewable portion of the plurality of visual sections 330 may display less than one, one or more than one visual section at a time, depending on the length of the visual section(s) and the size of the main viewing area 320.

The electronic reader 106, when starting to display a new electronic content, may display as much of the start of the plurality of visual sections in the main viewing area 320 as will fit in the main viewing area 320. The electronic reader 106 may also display as much of the start of the plurality of thumbnails in the content strip tray 310 as will fit in the content strip tray 310. The display of the plurality of visual sections 330 is synced with the display of the plurality of thumbnails 340 so that the visual section(s) that are displayed in the main viewing area 320 correspond with a subset of the thumbnail(s) that are displayed in the content strip tray 310.

The electronic reader 106 may display an accent effect 350 over an accent portion, within the viewable portion of the plurality of thumbnails 340 in the content strip tray 310, which corresponds to the viewable portion of the plurality of visual sections 330 in the main viewing area 320. This allows the user, after seeing where the accent portion is in relation to the viewable portion of the thumbnails 340 displayed in the content strip tray 310, to get a feel or a sense of where the user is in the source material, the electronic content or the plurality of visual sections. The accent effect 350 may comprise coloring, an overlay or using any other desired visual effect to show where the viewable portion of the visual sections 330 is in relation to the viewable portion of the thumbnails 340. (Step 1140)

Figure 4:
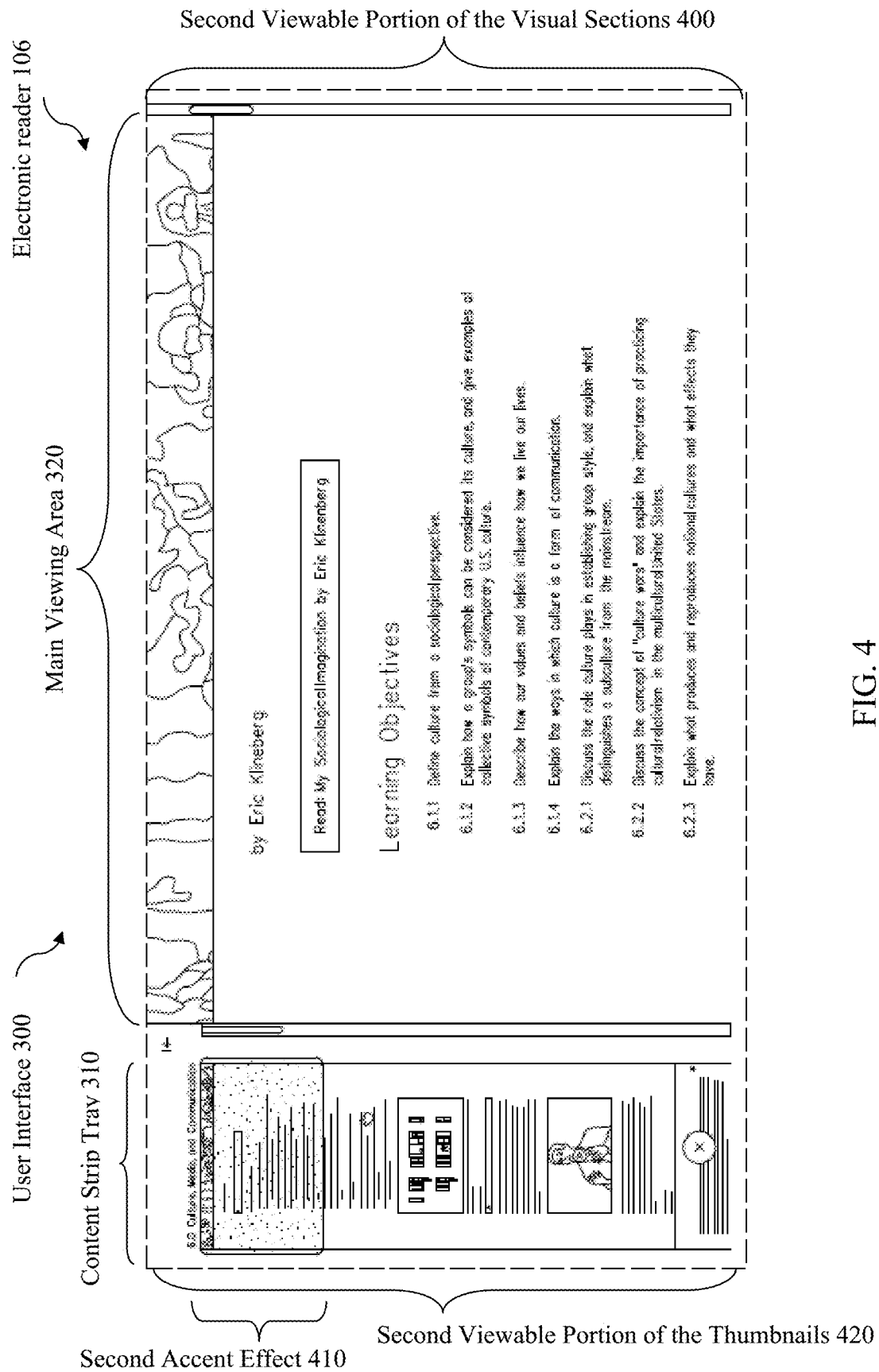
FIG. 4 illustrates a user interface, displayed on an electronic reader, with 1) a second viewable portion of visual sections displayed in a main viewing area; 2) a second viewable portion of thumbnails displayed in a content strip tray; and 3) a second accent effect, displayed on the viewable portion of the thumbnails, that corresponds with the viewable portion of the visual sections displayed in the main viewing area.

Referring to FIG. 4, as the user changes to a second viewable portion of the visual sections 400 in the main viewing area 320, the accent effect 350 (now a second accent effect 410) is preferably moved over the viewable portion of the thumbnails 340 (now a second viewable portion of the thumbnails 420) to reflect the current visual section(s) that are in the main viewing area 320.

The user may change which visual section(s) are in the main viewing area 320 using any desired technique. As non-limiting examples, the user may drag, using their finger or a mouse, different portions of the visual section(s), up or down, into the main viewing area 320. As another option, the user may drag, using their finger or the mouse, different portions of the thumbnail(s), up or down, into the content strip tray 310. As yet another option, the user may select a location within the viewable portion of the thumbnails 340 so that the corresponding location within the visual sections is displayed in the main viewing area 320. Alternatively, the user may use arrow keys to move the visual section(s) up or down within the main viewing area 320. With each movement or change of the viewable portion of the visual section in the main viewing area 320, the accent effect 350 moves over a corresponding portion within the viewable portion of the thumbnails 340.

In another embodiment, the electronic reader 106, may receive a command from the user to change from displaying the viewable portion of the plurality of visual sections 330 in the main viewing area 320 to displaying a second viewable portion of the plurality of visual sections 400 in the main viewing area 320. As a result of receiving this command, the electronic reader 106 may move the accent effect 350 from the accent portion of the plurality of thumbnails in the content strip to a second accent portion 410 within the plurality of thumbnails in the content strip tray 310 that corresponds to the second viewable portion of the plurality of visual sections 400 in the main viewing area 320.

In another embodiment, the electronic reader 106 may receive a command from the user that resulted from the user dragging the content strip. As a result of receiving this command, the electronic reader 106 may display a second viewable portion of the plurality of visual sections 400 in the main viewing area 320 to the user based on a direction and a length of the dragging the content strip by the user.

Figure 5:
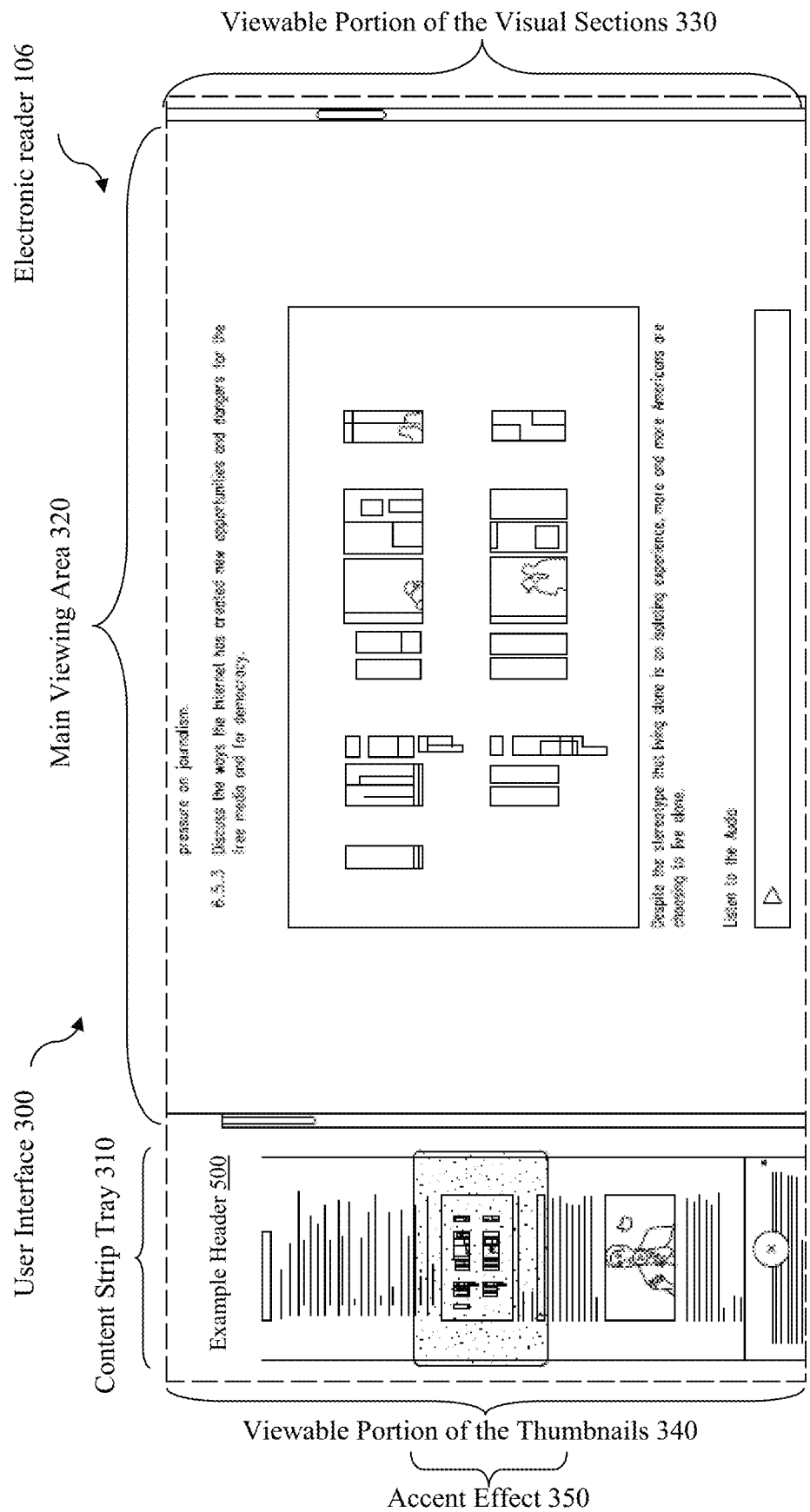
FIG. 5 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.

Referring to FIG. 5, in another embodiment, at least one thumbnail in the viewable portion of the plurality of thumbnails 340 may be labeled with a header 500 and the header 500 is preferably never displayed in the main viewing area 320.

Figure 6:
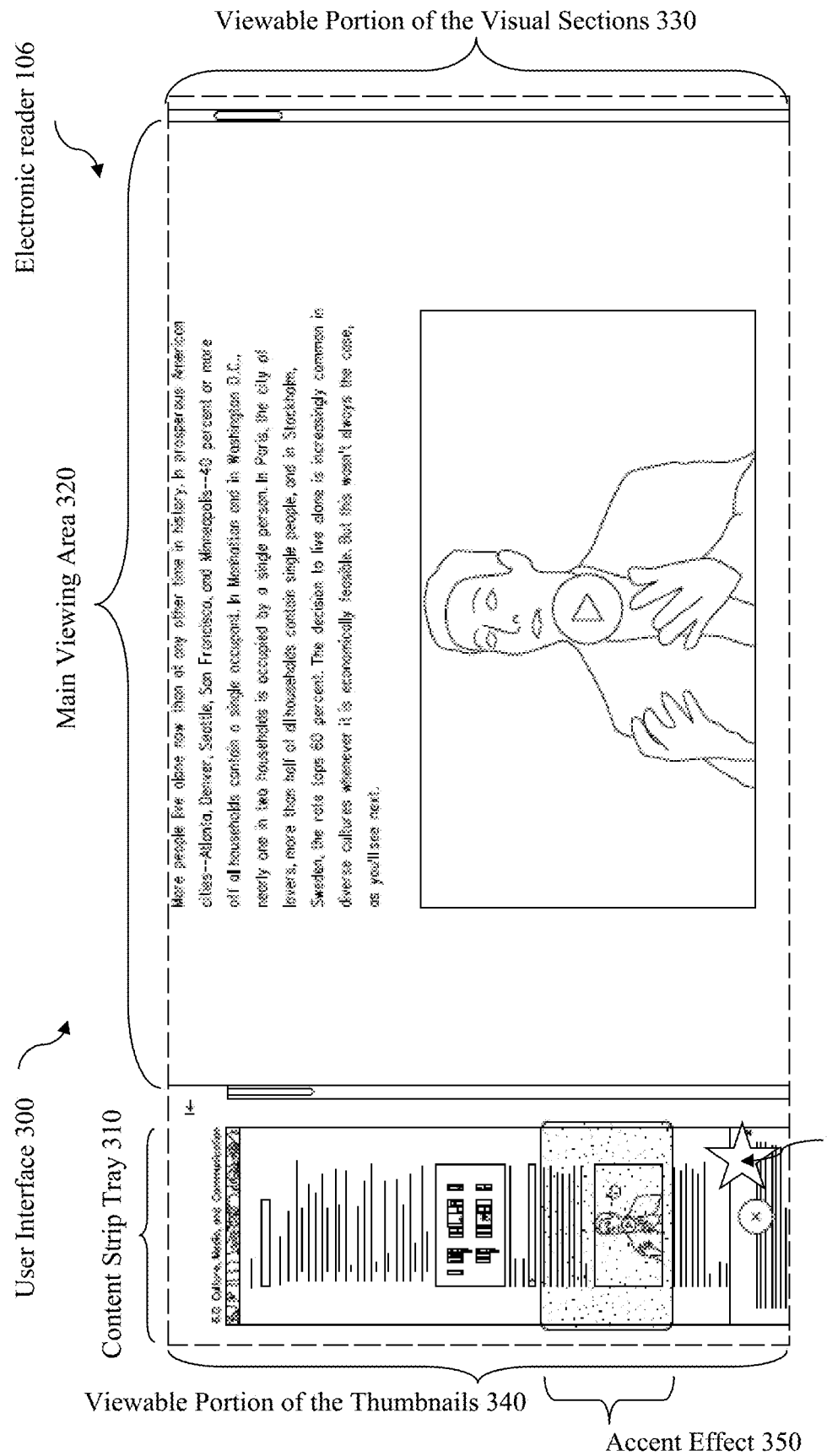
FIG. 6 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.

Referring to FIG. 6, in another embodiment, the electronic reader 106 may receive a command from the user to add a marker 600 at a location in the viewable portion of the plurality of thumbnails 340 to indicate a location in the plurality of visual sections. The electronic reader 106 may display the marker 600 at the desired location in the viewable portion of the plurality of thumbnails 340, but the marker 600 is preferably never displayed in the main viewing area 320.

Figure 7:
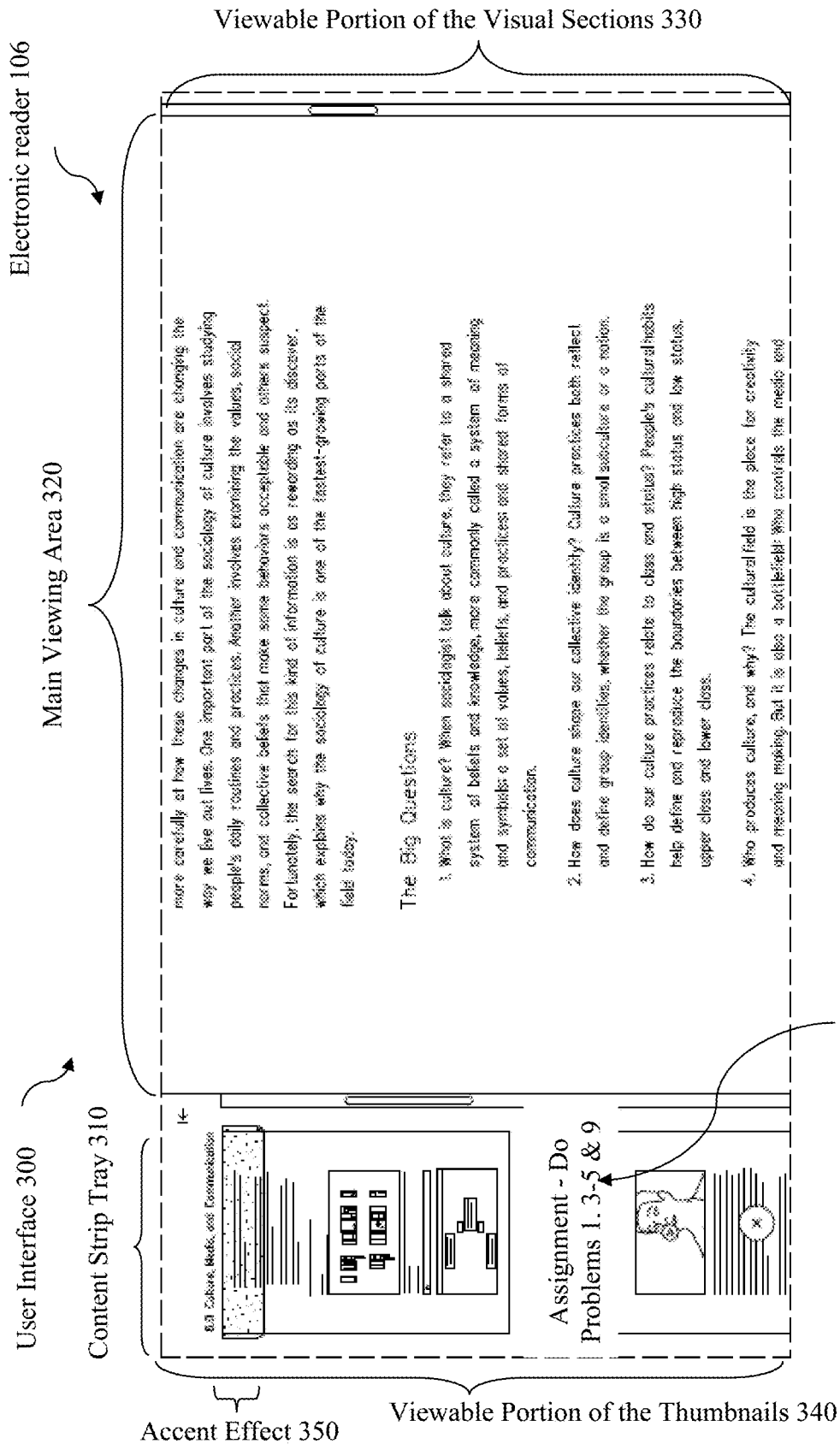
FIG. 7 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.

Referring to FIG. 7, in another embodiment, the electronic reader 106 may display an assignment 700, over the viewable portion of the plurality of thumbnails 340 in the content strip tray 310, to the user indicating an assignment 700 is associated with one of the plurality of thumbnails in the content strip tray 310. In preferred embodiments, the assignment 700 is never displayed in the main viewing area 320.

Figure 8:
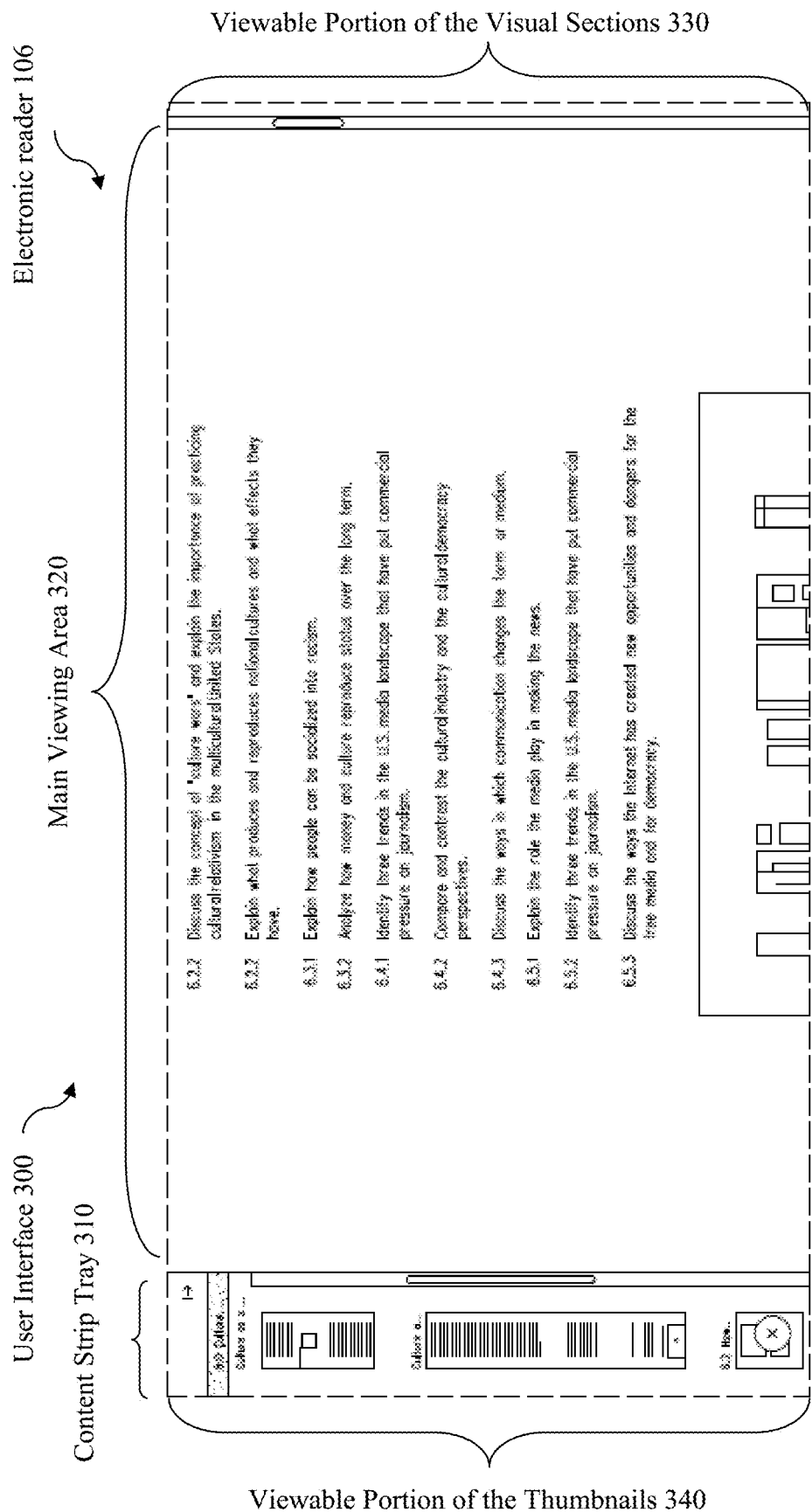
FIG. 8 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.
Figure 9:
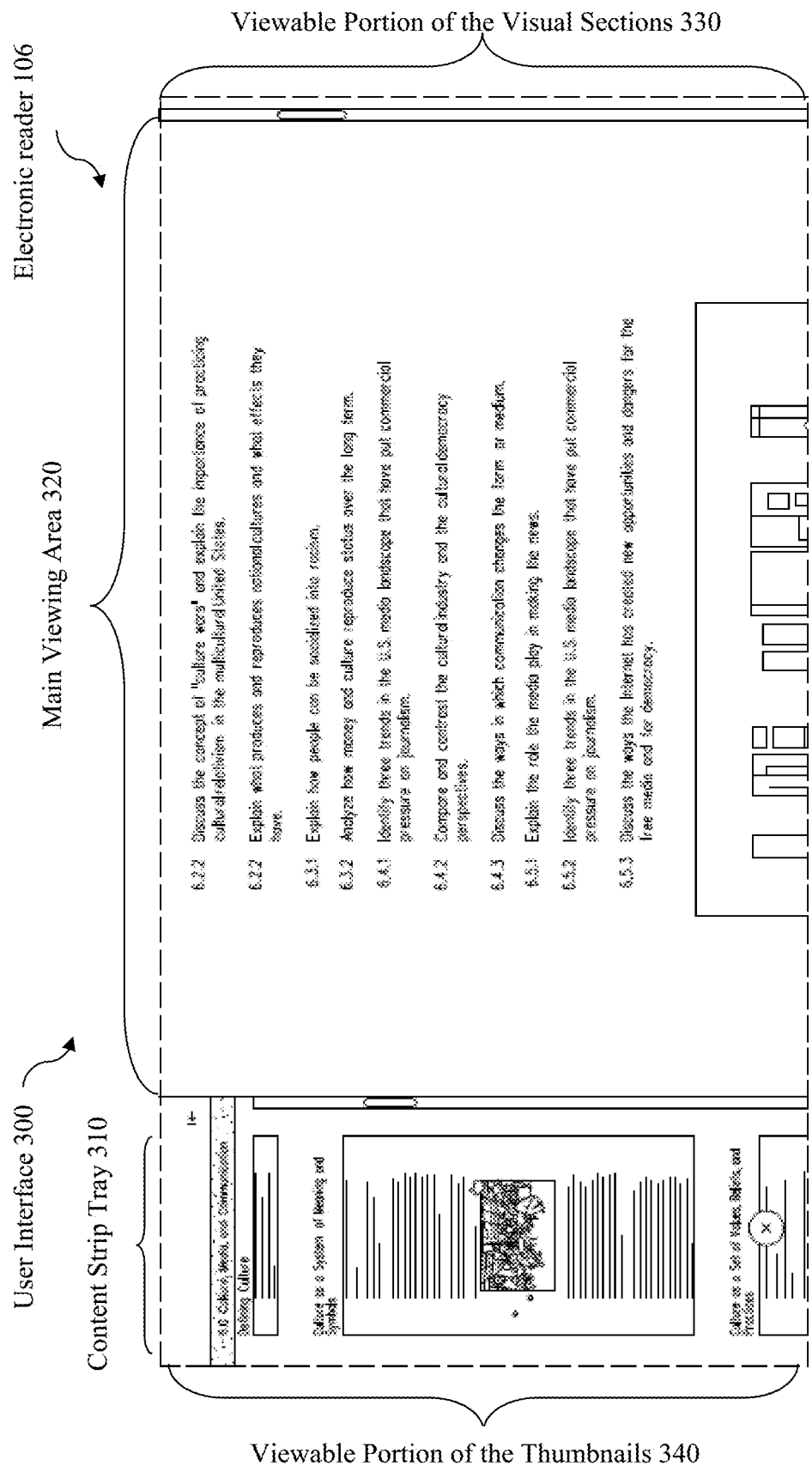
FIG. 9 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.

Referring to FIGS. 8 and 9, in another embodiment, the electronic reader 106 may receive a command to change the width of the content strip tray 310 and/or the main viewing area 320. The electronic reader 106 may display the content strip tray 310 and/or the main viewing area 320 with the new width. In some embodiments, the content strip tray 310 may be made to as wide as the user interface 300.

Figure 10:
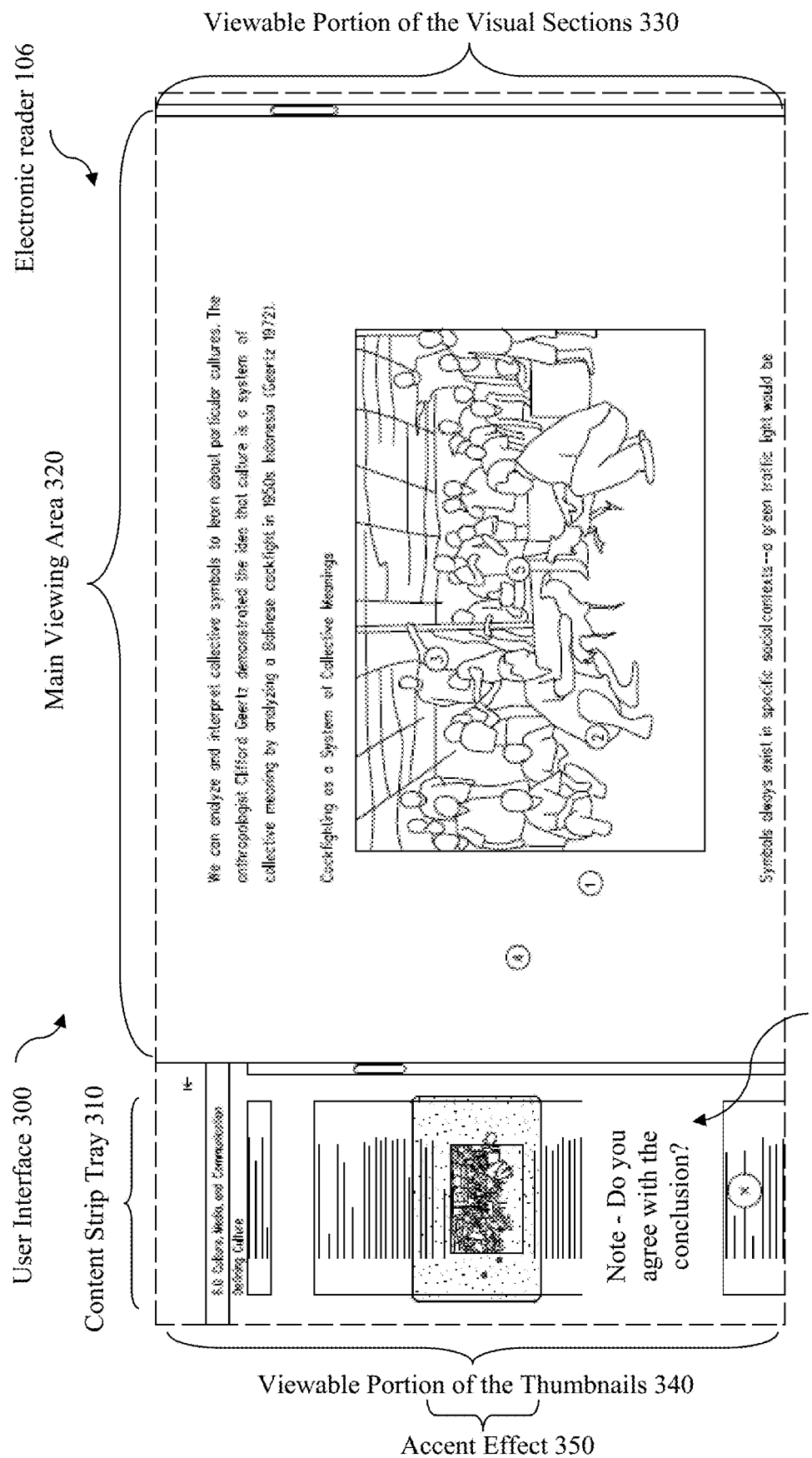
FIG. 10 illustrates a user interface, displayed on an electronic reader, with 1) a viewable portion of visual sections displayed in a main viewing area; 2) a viewable portion of thumbnails displayed in a content strip tray; and 3) an accent effect, displayed on the viewable portion of the thumbnails, that corresponds with the viewable portion of the visual sections displayed in the main viewing area.

Referring to FIG. 10, in another embodiment, the electronic reader 106 may display a note 1000 over the viewable portion of the plurality of thumbnails 340 in the content strip tray 310. The note 1000 may have been created by a teacher and be associated with one of the plurality of thumbnails in the content strip tray 310. The note 1000 may be a link that, if selected, provides additional information to the user. In preferred embodiments, the note 1000 is never displayed in the main viewing area 320.

In another embodiment, the invention provides a way for readers (users) of an electronic reader 106 to see a visual overview of a book or section that conveys the length and type of contents, as well as the structure of the book. The overview may be displayed in a small strip (i.e, a content strip tray 310) associated with a main view of the text (e.g., a page) that synchronizes with view as the user moves from place to place.

The viewable portion of the thumbnails 340 in the content strip tray 310 combines information about the book's structure with visual representation of the book's content to produce a series of grouped and labeled thumbnail images. A user can drag the viewable portion of the thumbnails 340 in the content strip trip to move to different locations within the electronic content. In addition, current and/or previous locations of the user may be indicated in the viewable portion of the thumbnails 340 in the content strip tray 310. Additional information such as assigned readings, due dates, completion status may also be indicated, possibly as overlays, on the viewable portion of the thumbnails 340 in the content strip tray 310.

The plurality of thumbnails may be generated by creating thumbnail images of a book's contents. These images proportionally correspond to the dimensions of the views of these contents in the main viewing area 320. The plurality of thumbnails may be generated at high enough resolution to show human-readable headers 500, subheaders and other text when displayed in an expanded view. Some of these text items may also be readable even in a contracted (smaller) view.

The plurality of thumbnails may be automatically arranged in visually distinct sections of the content strip tray 310. These sections may correspond to table-of-contents structures such as chapters, sections, and subsections. The sections of the plurality of thumbnails may be labeled automatically with corresponding text from a table of contents, truncated or otherwise reduced to fit the size of the content strip tray 310. These labels may be readable by the user.

The viewable portion of the thumbnails 340 may provide a visual overview, consisting of thumbnail graphics of a book's contents, and be assembled in a way that corresponds to the book's structure. Thumbnails may vary in length to reflect the length of corresponding content. The viewable portion of the thumbnails 340 may appear at a size small enough to get a sense of an overview, but with enough detail and resolution to convey the nature of the content (text, headline, image, video, chart, list, table, etc.).

The plurality of thumbnails may be displayed in a content strip tray 310. The content strip tray 310 is preferably in a vertically-oriented area of a user interface 300 and displayed adjacent to a main viewing area 320 displaying a viewable portion of the visual sections 330. The content strip tray 310 may have visual demarcations that group thumbnails by higher-level units. For example, thumbnails 4.1.1 and 4.1.2 may appear in a single section of the content strip tray 310, while thumbnails 4.2.1 and 4.2.2 may appear in another section of the content strip tray 310.

The content strip tray's sections may be visually distinct from each other by virtue of their color, shading or size. The structure of the content strip tray 310 may be generated from a hierarchical Table of Contents (ToC) listed by means of an algorithm that parses the level a ToC item is on.

The various ToC levels are not only used to generate content strip tray sections, but may also be used to provide the ToC item's name, or portion thereof, as a label at the top of the content strip tray section, as well as a label for each thumbnail image.

A current location indicator, possibly consisting of a translucent visual overlay or any other accent effect 350, may be superimposed on the viewable portion of the thumbnails 340. The size of the accent effect 350 preferably corresponds to the size of the user's view of the viewable portion of the visual sections 330. In other words, if a user is using a tall screen, the accent effect 350 will be proportionally taller, spanning more of the underlying thumbnail than a short screen used to view the same content. A phone in landscape mode, for example, would have a shorter indicator. The accent effect 350 may move automatically in response to the user's scrolling and navigating to various parts of the visual sections in the main viewing area 320. The user can also drag the accent effect 350 to drive the main viewing area 320 to move to a different second viewable portion of the visual sections 400.

In another embodiment, the user may expand the content strip tray 310 to show more detail in the viewable portion of the thumbnails 340 and more text for ToC item labels. In one implementation the content strip tray 310 may be expanded to actually become the main content view itself, erasing the distinction between a two-viewing area system. The user may simply move between a small overview and the "full-sized" text via a seamless expansion or contraction of the content strip tray 310.

In another embodiment, a user may mark a current location to return to it later via a kind of "pinning." Pinning may attach a visual icon or mark to a place in the content strip tray 310 corresponding to the viewable portion of the visual sections 330. The user may label the pin and the system may add information to the pin (such as nearby textual headings or content element labels, like an image title, the current date/time, or whether the referenced content is part of a reading assignment—and whether or not the due date for that assignment has passed). Pins may be limited to a small number. New pins beyond that limit replace the oldest pin on the "stack." Pins may also be read and displayed by a separate "bookmark" container or list that the user may access from outside the electronic reader 106 itself.

In another embodiment, the content strip tray 310 may automatically indicate which sections of a book are part of an assigned reading. Assigned readings may be indicated by a visual mark or icon overlaid on the strip on the thumbnail or content item name. Users may see more information about the assignment, such as due date, amount left to read, completion status, etc, by interacting with (clicking, tapping, hovering over) the assigned reading marker or icon in the strip.

In another embodiment, an annotation made by the reader/user or an instructor may be visually indicated on the viewable portion of the thumbnails 340. A visual mark or icon whose color or shape corresponds to the color or label of the annotation may be placed on or near the location where the annotation has been added. The user may click or tap on the annotation icon to display the annotation and its associated text in the main view.

The present invention is convenient, since it may be used without leaving the current reading context, and intuitive because it may provide a visual mirror-image of a book's contents, along with clear grouping and labeling of these contents. Being able to see the relative sizes of sections may help users estimate the length of reading assignments. Being able to see the type of content within sections may also help the user estimate length and level of effort needed.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising a hardware computing device coupled to a network and comprising at least one processor executing specific computer-executable instructions within a memory, wherein the system is configured to:

convert a corpus of electronic content into a plurality of contiguous visual sections, wherein each visual section, in the plurality of visual sections, has a length, based on a length of the corresponding visual section in the corpus of electronic content, and a type of content and a structure;

convert the corpus of electronic content or the plurality of visual sections into a plurality of contiguous thumbnails that correspond to the plurality of visual sections, wherein each thumbnail, in the plurality of thumbnails, is proportional in length to, and visually indicates a type of content and a structure of, a corresponding visual section, in the plurality of visual sections;

display in a main viewing area of a user interface on an electronic reader to the user a viewable portion of the plurality of visual sections;

display in a content strip tray of the user interface on the electronic reader to the user a viewable portion of the plurality of thumbnails; and display an accent effect over an accent portion, within the viewable portion of the plurality of thumbnails in the content strip tray, wherein the accent portion corresponds to the viewable portion of the plurality of visual sections in the main viewing area on the electronic reader.

2. The system of claim 1, wherein the system is further configured to:

receive a command from the user to change from displaying the viewable portion of the plurality of visual sections in the main viewing area to displaying a second viewable portion of the plurality of visual sections in the main viewing area; and move the accent effect from the accent portion of the plurality of thumbnails in the content strip to a second accent portion within the plurality of thumbnails in the content strip tray, wherein the second accent portion within the plurality of thumbnails in the content strip tray corresponds to the second viewable portion of the plurality of visual sections in the main viewing area.

3. The system of claim 1, wherein the system is further configured to:

receive a command from the user that resulted from the user dragging the content strip; and display a second viewable portion of the plurality of visual sections in the main viewing area to the user, wherein the second viewable portion of the plurality of visual sections in the main viewing area is selected based on a direction and a length of the dragging of the content strip by the user.

4. The system of claim 1, wherein the system is further configured to:

label at least one thumbnail, in the viewable portion of the plurality of thumbnails, with a header, wherein the header is never displayed in the main viewing area.

5. The system of claim 1, wherein the system is further configured to:

receive a command from the user to add a marker at a location in the viewable portion of the plurality of thumbnails to indicate a location in the plurality of visual sections, wherein the marker is never displayed in the main viewing area; and display the marker at the location in the viewable portion of the plurality of thumbnails.

6. The system of claim 1, wherein the system is further configured to:

display an assignment, over the viewable portion of the plurality of thumbnails in the content strip tray, to the user indicating an assignment is associated with one of the plurality of thumbnails in the content strip tray, wherein the assignment is never displayed in the main viewing area.

7. The system of claim 1, wherein the system is further configured to:
display a note, over the viewable portion of the plurality of thumbnails in the content strip tray, to the user indicating a note, from a teacher, associated with one of the plurality of thumbnails in the content strip tray.

8. The system of claim 1, wherein the system is further configured to:
receive a command from the user to increase or decrease a width of the content strip tray to a new width; and
display the content strip tray having the new width to the user.

9. The system of claim 1, wherein the accent effect indicates the current user location within the viewable portion of the plurality of thumbnails.

10. The system of claim 1, wherein the system is further configured to:
receive a command from the user that resulted from the user selecting a desired location on a thumbnail, in the plurality of thumbnails, in the content strip tray; and
display in the main viewing area a location in the plurality of visual sections that corresponds with the selected desired location on the thumbnail in the content strip tray.

11. A method of visually indicating to a user lengths, types of content, structure and current user location within a corpus of electronic content, comprising the steps of:
converting the corpus of electronic content into a plurality of contiguous visual sections, wherein each visual section, in the plurality of visual sections, has a length, based on a length of a corresponding visual section in the corpus of electronic content, and a type of content and a structure;
converting the corpus of electronic content or the plurality of visual sections into a plurality of contiguous thumbnails that correspond to the plurality of visual sections, wherein each thumbnail, in the plurality of thumbnails, is proportional in length to, and visually indicates a type of content and a structure of, a corresponding visual section, in the plurality of visual sections;
displaying, by an electronic reader, in a main viewing area of a user interface to the user a viewable portion of the plurality of visual sections;
displaying, by the electronic reader, in a content strip tray of the user interface to the user a viewable portion of the plurality of thumbnails; and
displaying, by the electronic reader, an accent effect over an accent portion, within the viewable portion of the plurality of thumbnails in the content strip tray, wherein the accent portion corresponds to the viewable portion of the plurality of visual sections in the main viewing area.

12. The method of claim 11, further comprising the steps of:
receiving, by the electronic reader, a command from the user to change from displaying the viewable portion of the plurality of visual sections in the main viewing area to displaying a second viewable portion of the plurality of visual sections in the main viewing area; and
moving, by the electronic reader, the accent effect from the accent portion of the plurality of thumbnails in the content strip to a second accent portion within the plurality of thumbnails in the content strip tray, wherein the second accent portion within the plurality of thumbnails in the content strip tray corresponds to the second viewable portion of the plurality of visual sections in the main viewing area.

13. The method of claim 11, further comprising the steps of:
receiving, by the electronic reader, a command from the user that resulted from the user dragging the content strip; and
displaying, by the electronic reader, a second viewable portion of the plurality of visual sections in the main viewing area to the user, wherein the second viewable portion of the plurality of visual sections in the main viewing area is selected based on a direction and a length of the dragging the content strip by the user.

14. The method of claim 11, further comprising the step of:
labeling at least one thumbnail, in the viewable portion of the plurality of thumbnails, with a header, wherein the header is never displayed in the main viewing area.

15. The method of claim 11, further comprising the steps of:
receiving, by the electronic reader, a command from the user to add a marker at a location in the viewable portion of the plurality of thumbnails to indicate a location in the plurality of visual sections, wherein the marker is never displayed in the main viewing area; and
displaying, by the electronic reader, the marker at the location in the viewable portion of the plurality of thumbnails.

16. The method of claim 11, further comprising the step of:
displaying, by the electronic reader, an assignment, over the viewable portion of the plurality of thumbnails in the content strip tray, to the user indicating an assignment is associated with one of the plurality of thumbnails in the content strip tray, wherein the assignment is never displayed in the main viewing area.

17. The method of claim 11, further comprising the step of:
displaying, by the electronic reader, a note, over the viewable portion of the plurality of thumbnails in the content strip tray, to the user indicating a note, from a teacher, associated with one of the plurality of thumbnails in the content strip tray.

18. The method of claim 11, further comprising the steps of:
receiving, by the electronic reader, a command from the user to increase or decrease a width of the content strip tray to a new width; and
displaying, by the electronic reader, the content strip tray having the new width to the user.

19. The method of claim 11, wherein the accent effect indicates the current user location within the viewable portion of the plurality of thumbnails.

20. The method of claim 11, further comprising the steps of:
receiving, by the electronic reader, a command from the user that resulted from the user selecting a desired location on a thumbnail, in the plurality of thumbnails, in the content strip tray; and
displaying, by the electronic reader, in the main viewing area a location in the plurality of visual sections that corresponds with the selected desired location on the thumbnail in the content strip tray.

* * * * *